(12) United States Patent
Olausson et al.

(10) Patent No.: US 6,210,455 B1
(45) Date of Patent: Apr. 3, 2001

(54) EVAPORATION APPARATUS FOR EVAPORATION OF LIQUIDS

(75) Inventors: Lars Olausson, Angered; Michael Thiede, Hisings-Karra; Olle Wennberg; Anders Wernqvist, both of Gothenburg; Martin Collander, Kungalv, all of (SE)

(73) Assignee: Kvaerner Pulping AB (SE)

( * ) Notice: Subject to any disclaimer, the term of this patent is extended or adjusted under 35 U.S.C. 154(b) by 0 days.

(21) Appl. No.: 09/284,334

(22) PCT Filed: Oct. 9, 1997

(86) PCT No.: PCT/SE97/01684

§ 371 Date: Apr. 9, 1999

§ 102(e) Date: Apr. 9, 1999

(87) PCT Pub. No.: WO98/16684

PCT Pub. Date: Apr. 23, 1998

(30) Foreign Application Priority Data

Oct. 11, 1996 (SE) .................................................. 9603711

(51) Int. Cl.$^7$ ........................... B01D 45/08; B01D 45/12; B01D 50/00

(52) U.S. Cl. .................. 55/318; 55/434; 55/440; 55/DIG. 23; 96/189; 159/31

(58) Field of Search .............................. 55/318, 320, 434, 55/DIG. 23, 440; 96/188, 189, 190; 159/22, 31

(56) References Cited

U.S. PATENT DOCUMENTS

| 1,003,912 | 9/1911 | Kestner . |
| 1,005,553 | 10/1911 | Kestner . |
| 1,797,232 | * 3/1931 | How ....................................... 159/31 |
| 5,246,541 | 9/1993 | Ryham . |

\* cited by examiner

*Primary Examiner*—David A. Simmons
*Assistant Examiner*—Robert A. Hopkins
(74) *Attorney, Agent, or Firm*—Fasth Law Offices; Rolf Fasth

(57) ABSTRACT

An evaporation apparatus for evaporation of, for example, spent liquor from pulp cooking. The apparatus has a vertical cylinder that has evaporation surfaces disposed therein. An outlet opening is defined in a widened part of the cylinder to receive driven-off steam. A skirt is disposed in the cylinder and surrounds the evaporated liquid and driven-off steam and has a diameter that is smaller than a diameter of the widened part. The skirt has an open bottom and a skirt opening is defined in a portion of the skirt that is facing away from the outlet opening.

9 Claims, 4 Drawing Sheets

EVAPORATION APPARATUS FOR EVAPORATION OF LIQUIDS

TECHNICAL FIELD

The present invention relates to an evaporation apparatus for evaporation of liquids, especially liquids such as spent liquor from pulp cooking or other liquids within the pulping industry, which evaporation apparatus consists principally of a vertical cylinder in which evaporated liquid is collected in the basin-shaped bottom part and vaporized steam is removed in the cylinder wall slightly above the pool of liquid in the basin-shaped bottom part. The invention relates in particular to an arrangement for separating liquid droplets from vaporized steam.

BACKGROUND INFORMATION AND SUMMARY OF THE INVENTION

Evaporation apparatuses for evaporation of liquids, for making these more highly concentrated or for separating solid substances from solvents, are generally known and are used generally within the chemical industry. In the pulping industry, such evaporators are used in particular for evaporating the spent liquor from pulp cooking, which spent liquor has to be concentrated by removal of water so that it can be combusted in a later stage, for example in a recovery boiler. These evaporation apparatuses consist principally of a vertical plate cylinder with vertically disposed tubes through which the liquid intended for evaporation is made to flow, while steam at higher temperature and pressure is made to flow in the opposite direction and condense on the outside of the tubes. The necessary heat for evaporation of the liquid, in the case of spent liquor from the pulping industry, is thus supplied through the tube walls. It is customary for the liquid intended for evaporation to be made to run downwards and for the heating steam to flow upwards in separate systems. The evaporated liquid thus falls down into the bottom of the cylinder-shaped evaporation apparatus, which bottom is usually slightly widened, and the vaporized steam is removed at the bottom part slightly above the pool of liquid which is formed in the preferably basin-shaped bottom part by evaporated liquid.

There are many different constructions of such evaporation apparatuses. Thus, evaporators can be arranged for motive steam to flow through the inside of the tubes while the liquid to be evaporated is made to run down the outside. Horizontally disposed tubes may also be provided, as well as plates whose surfaces are made to serve as evaporation surfaces.

In the pulping industry it is customary to evaporate black liquor in several stages, by series or parallel coupling of several evaporation apparatuses. The units, which are called effects, are numbered in accordance with the steam supply in the installation. Thus, fresh steam is supplied to the first effect, and in the subsequent stages the liquor steam which has been obtained in preceding stages is used as a heat source. This is possible by means of the successive reduction in pressure. Liquor steam from the last effect condenses in one or more surface condensers. By allowing the liquor steams to condense out in stages on different heat surfaces in the installation, it is possible to separate off, on the one hand, highly contaminated condensate for purification in, for example, a stripper column, and, on the other hand, purer condensate which can be used directly in the mill without odour treatment or other purification.

At the present time, ever greater demands are being made in most countries for a cleaner environment. Water which is to be discharged into rivers and the like must be pure, or at least so pure that it does not cause environmental problems. It is no longer possible to discharge semi-pure condensate. One way of reducing discharges could be for the condensate to be re-used as process water in the mill.

Insufficiently careful separation of evaporated liquid from vaporized steam, by means of small or large droplets being entrained with the steam, so-called liquor carry-over, which gives the condensate formed a brownish character, means that the condensate cannot be returned without further cleaning to the fibre line, e.g. for bleaching. The separation of the evaporated liquid from vaporized steam must therefore be virtually complete if the condensate is to be re-used as process water in the last stages of the fibre line, without impairing the quality of the final product, the paper pulp.

According to the prior art, a vertical cylindrical space without a bottom has therefore been arranged under the evaporation surfaces, by means of which the steam and the droplets are made to flow downwards, the larger droplets settling on the underlying bottom of the evaporation apparatus, and the small droplets being carried along in the flow of steam which is deflected upwards and separated in a droplet separator for vertical approach flow. After this separation of the small droplets which come together in the droplet separator and run down into the pool of liquid, the purified steam is led out from the effect.

Since the steam flowing upwards on the outside of the cylindrical space will have different speeds in different parts of the annular space outside the skirt, the droplet separation will also be non-uniform. The speed of the steam will be greatest nearest the outlet opening, and at the diametrically opposite side of this it is possible to have very low speeds and even downward flows through the droplet separator. There is therefore a considerable need for an even approach flow of vaporized steam towards the droplet separator and a consequently better separation of the droplets, with concomitant reduction in the cost of the construction.

According to the present invention, the above-mentioned problem of carry-over of liquid droplets has therefore been solved by making available an evaporation apparatus for evaporation of liquids, such as spent liquor from pulp cooking, comprising a vertical cylinder with inlet and outlet openings for steam and liquid, and evaporation surfaces in the cylinder, the apparatus being arranged to generate a downward flow of evaporated liquid and driven-off steam, which is characterized in that the outlet opening for driven-off steam is situated in the lower and preferably widened part of the cylinder, and in that the lower part of the space under the evaporation surfaces, the "skirt", surrounding the evaporated liquid and driven-off steam, is cylindrical with a smaller cross-sectional diameter than the lower part of the cylinder which has the outlet opening for steam, and in that the skirt, in addition to having an open bottom, also has an opening for outflowing steam on that part of the skirt which faces away from the outlet opening in the outer cylinder.

According to the invention, it is expedient for the opening in the skirt to be made by means of the latter having been cut obliquely downwards.

It is however possible, according to the invention, for the opening in the skirt to be made by means of its having been cut in a stepped shape downwards.

According to the invention, the skirt, with its lower edge not cut away, is intended to extend down into the underlying pool of evaporated liquid in the bottom part of the cylinder.

According to the invention, it is expedient for the skirt to be curved inwards at its upper part.

According to the invention, droplet separators for horizontal approach flow of steam are expediently arranged, in the direction of movement of the steam, in front and on both sides of the outlet opening.

According to the invention, the droplet separators can consist of two or more sections arranged one above the other.

According to the invention, the upper section or sections of the droplet separators are expediently arranged, in the approach flow direction of the steam, in front of the underlying section or sections.

According to the invention, drainage systems for liquid emptying into the pool of liquid in the bottom part of the cylinder are expediently arranged in each section of the droplet separator.

BRIEF DESCRIPTION OF THE FIGURES

The invention will be described in greater detail hereinbelow with reference to the attached figures, of which.

DETAILED DESCRIPTION

Figure 1:
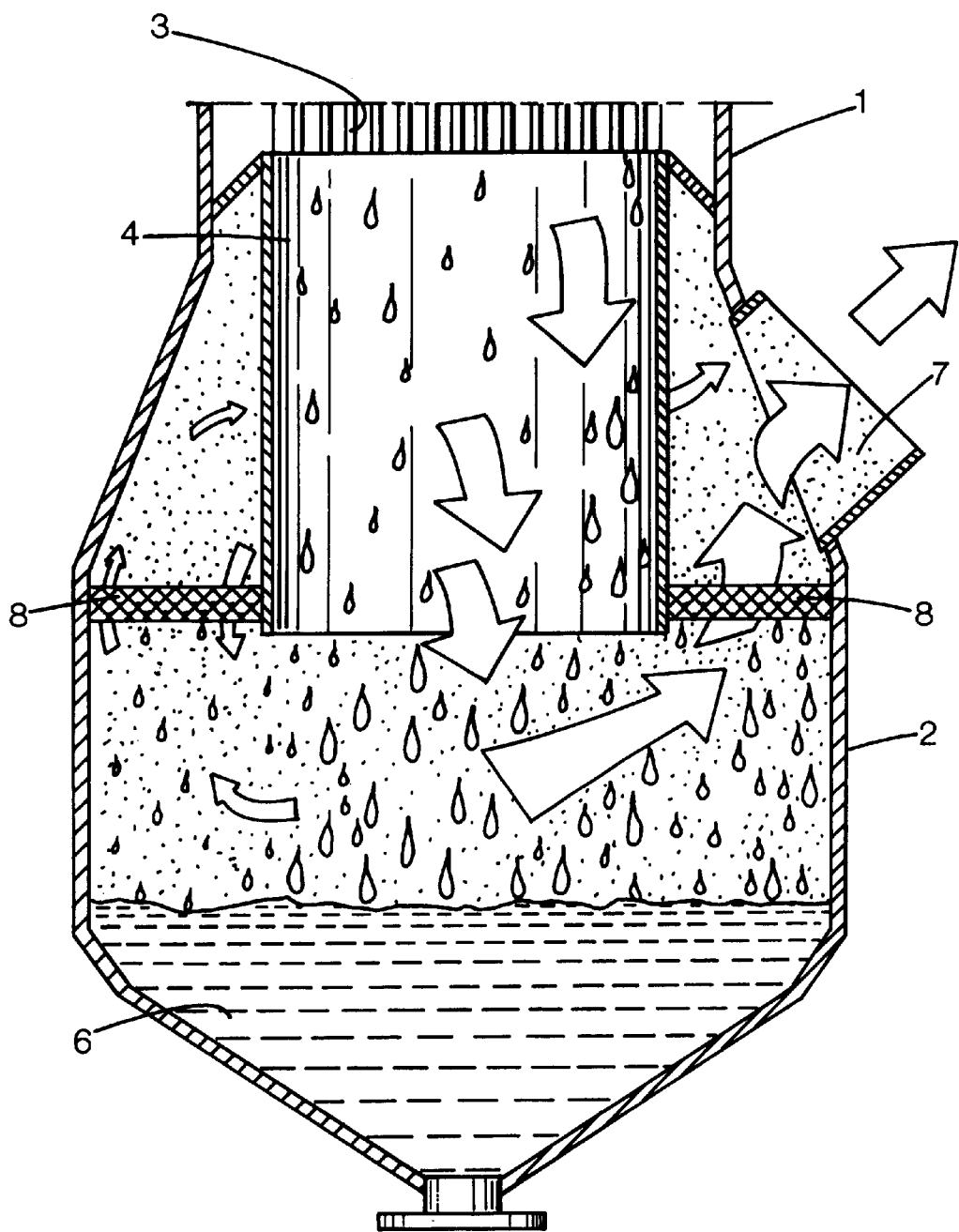
FIG. 1 shows a vertical section of the lower part of an evaporator according to the prior art.

FIG. 1 shows the lower part of a vertically disposed, cylinder-shaped evaporator 1 of a known type, with a widened lower part 2, and the lower part of the tube assembly 3 where the actual evaporation takes place. The space below the evaporation tubes 3 is delimited by a cylinder-shaped so-called skirt 4, open at the bottom, through which vaporized steam and evaporated liquid in the form of droplets are made to flow downwards. The droplets are collected together in the lower part 2 of the cylinder 1 in the form of a pool 6, and the vaporized steam is made to flow out through an outlet 7. From the lower part 2, arrangements (not detailed) are made for removing liquid from the pool 6 of liquid. The large liquid droplets fall like rain down into the pool 6 of liquid, while the smaller ones have a marked tendency to be entrained upwards with the steam as it is deflected at the skirt edge. A droplet separator 8 is therefore arranged for collecting these small droplets. This droplet separator 8 has a vertical approach flow. Droplet separators per se are well known; they consist, for example, of an assembly of bent deflection plates, and are not described in detail here.

The ability of the droplet separator to separate droplets from the gas flow is highly dependent on the speed of the gas flow. The greater the gas flow, the poorer the droplet separation. It is therefore important that the speed of the gas flow approaching the droplet separator is uniform in all parts. However, the way this arrangement according to the prior art is made, the flow approaching the droplet separator does not have a uniform speed everywhere, and instead the speed will be greater the nearer to the outlet opening 7 the gas flow runs through the droplet separator 8. On that side of the widened bottom part 2 which lies diametrically furthest away from the outlet opening 7, the flow of steam will have its lowest speed, and it may even be possible for there to be a downward flow of steam.

In order to ensure that a droplet separator according to the prior art will be able to function, the lower part 2 of the apparatus must of course be made very large so that a sufficiently low speed of steam is obtained near the outlet 7. The droplet separator 8 is otherwise overloaded in the region nearer the outlet opening 7 and liquor droplets are entrained with the outflowing steam.

Figure 2:
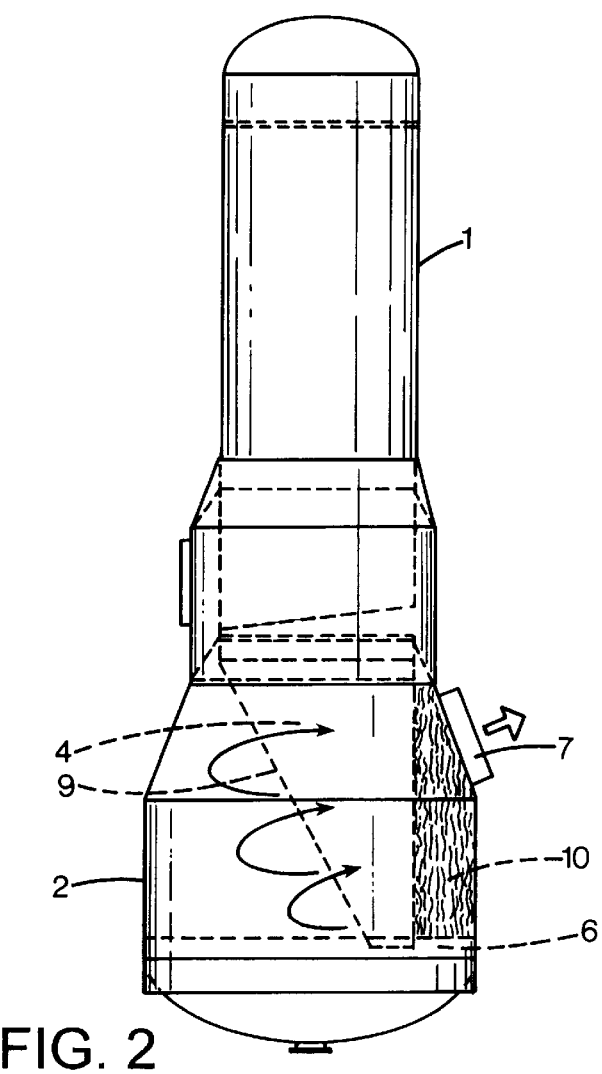
FIG. 2 shows a diagrammatic representation of an evaporator according to the present invention.

FIG. 2 shows diagrammatically how an evaporation apparatus 1 according to the present invention is made. It looks in principle like the one in FIG. 1, but it has a modified skirt 4. The skirt 4 has, however, an opening outwards to the left in the figure, which opening has been produced by means of the skirt 4 having been cut off obliquely at the edge 9. The skirt protrudes, via its part not cut off, into the pool 6 of liquid. The previous droplet separator 8 with vertical approach flow has been replaced, according to the invention, by droplet separators 10 with horizontal approach flow. These droplet separators 10 are not necessary per se in all cases. For example, the outflowing steam can be conveyed in co-current with the liquor in the tubes in another evaporation apparatus. This affects the downwardly running film of liquor (more turbulence) so that a higher heat transfer is obtained.

The steam/liquid mixture flowing downwards inside the skirt will be deflected in a radial direction outwards as it flows down through the skirt and then deflected in a tangential direction past the skirt edge 9 and towards the droplet separators 10. The direction of flow is in this way changed in two stages. First from an axial direction downwards to a radial direction outwards, and then a tangential direction in the space between the skirt and the jacket wall of the widened part 2 of the cylinder 1. The liquid droplets are in this way flung slightly outwards when deflection occurs and fasten to a wall surface, and the droplet separators 10 acquire a uniform horizontal approach flow. In this way it is possible to build the lower part 2 of the evaporation apparatus 1 smaller, since the approach flow towards the droplet separators 10 is to all intents and purposes uniform.

Figure 3A:
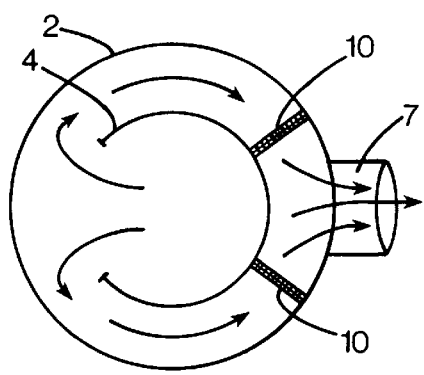
FIGS. 3A and 3B show a droplet separator arrangement according to the invention, seen from above and from the side.
Figure 3B:
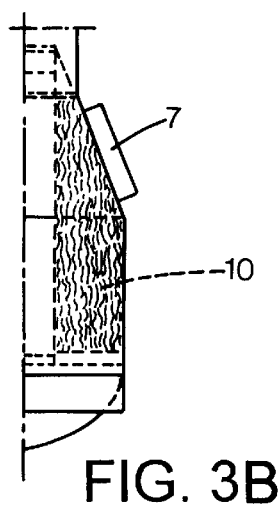

FIG. 3A shows a horizontal section and FIG. 3B a vertical section through the lower part 2 of the cylinder 1 which is shown in FIG. 2. There are two droplet separators 10 on each side of the outlet opening 7. These droplet separators 10 close off the whole annular space between the skirt 4 and the cylinder wall 2 in the lower widened part of the evaporation apparatus, for which reason all the steam has to flow through these droplet separators 10. In the present case, the droplet separators 10 are mounted upright and with relatively small thickness, but other types of droplet separators may also be used.

For the sake of clarity, the lower liquor space can be divided into three flow regions.

I. Inside the diagonally cut skirt.

II. The annular corridor outside the skirt, before the horizontally approached droplet separators.

III. The annular corridor outside the skirt, after the droplet separator, before the outlet.

The design of the lower liquor space creates a flow which is characterized by the following.

1. The flow of steam, as it leaves the tube plate and passes into the region I, is directed downwards for the whole cross-section. The flow thus has only an axial speed.

2. The flow at the centre of region I continues axially downwards. The axial speed decreases and the radial speed increases.

3. The flow in those parts of region I which are open for transport into region II has a high radial speed.

4. The flow, from region I which reaches the skirt edge, changes direction when it passes into region II. The speed becomes tangential.

5. This change in the direction of flow occurs successively in the axial direction.

6. The flow, when it leaves region II, has a uniform tangential speed towards the droplet separator.

7. The flow, when it passes into region III, again changes direction and accelerates towards the outlet.

By designing the lower liquor space in the manner described, a flow is generated which is very near the optimum. The optimum design gives the following results.

1. A maximum separation of droplets occurs even before the droplet separator, since the steam is twice deflected at right angles from its original direction of movement (only very small droplets with extremely small mass manage to remain with the steam). In this way, the loading of the droplet separator is minimized.

2. The approach flow to the droplet separator has a uniform speed profile and the total approach flow surface of the whole droplet separator is utilized. The degree of separation by the droplet separator is maximized in this way.

3. Separated liquid in the droplet separator may sometimes be concentrated into large droplets which can be carried along with the steam downstream of the droplet separator, a problem which is referred to as entrainment. The uniform speed profile, however, means that the speeds downstream of the droplet separator are minimized. This also minimizes the risk of these larger droplets being carried along with the steam out of the evaporation apparatus, and instead they fall downwards.

Figure 4:
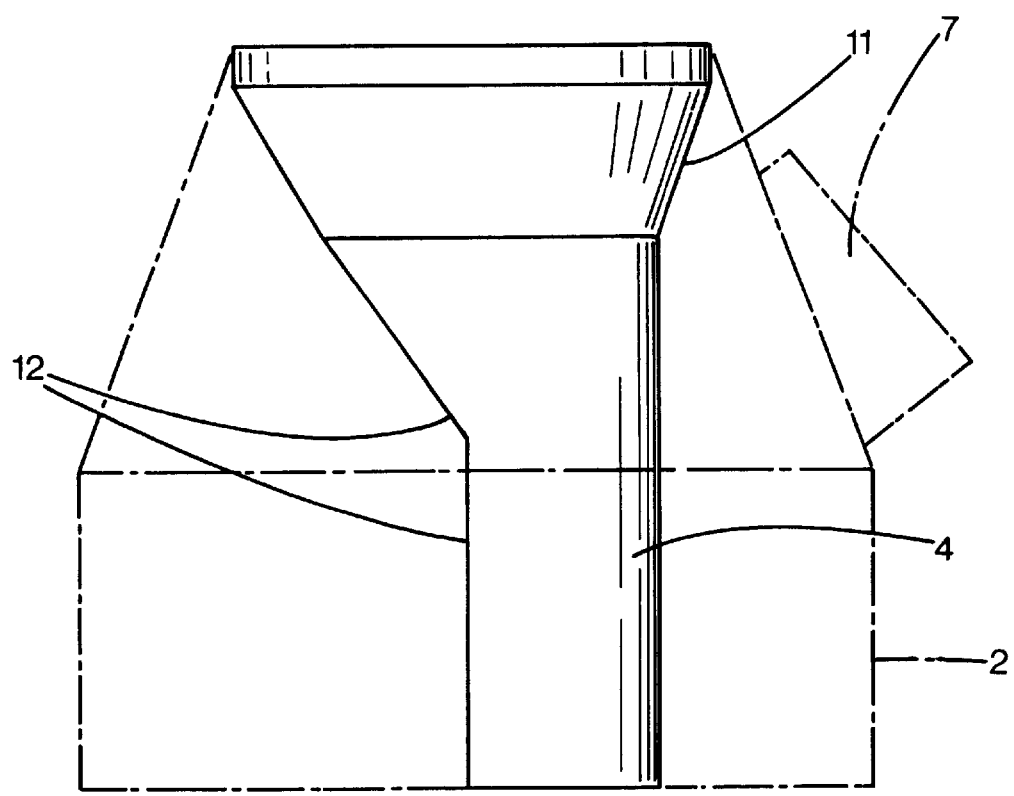
FIG. 4 shows a further embodiment of the present invention.

FIG. 4 shows another embodiment of the present invention. Here, the skirt 4 is curved inwards at the part 11, and the skirt edge 12 has been cut with an upper diagonal edge and a lower vertical edge. The upper part of the annular space between the skirt 4 and the lower part 2 of the evaporation apparatus is in this case larger, which affords a more favourable, slower flow towards the outlet 7 and the possible droplet separators 10.

Figure 5A:
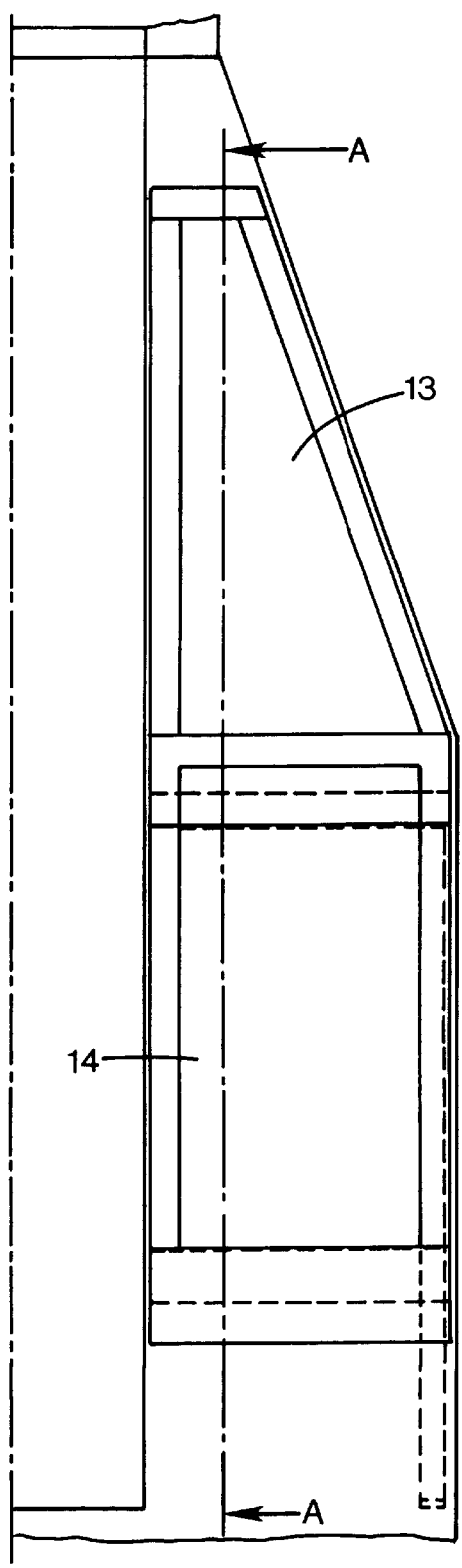
FIGS. 5A and 5B show a second embodiment of the separator.
Figure 5B:
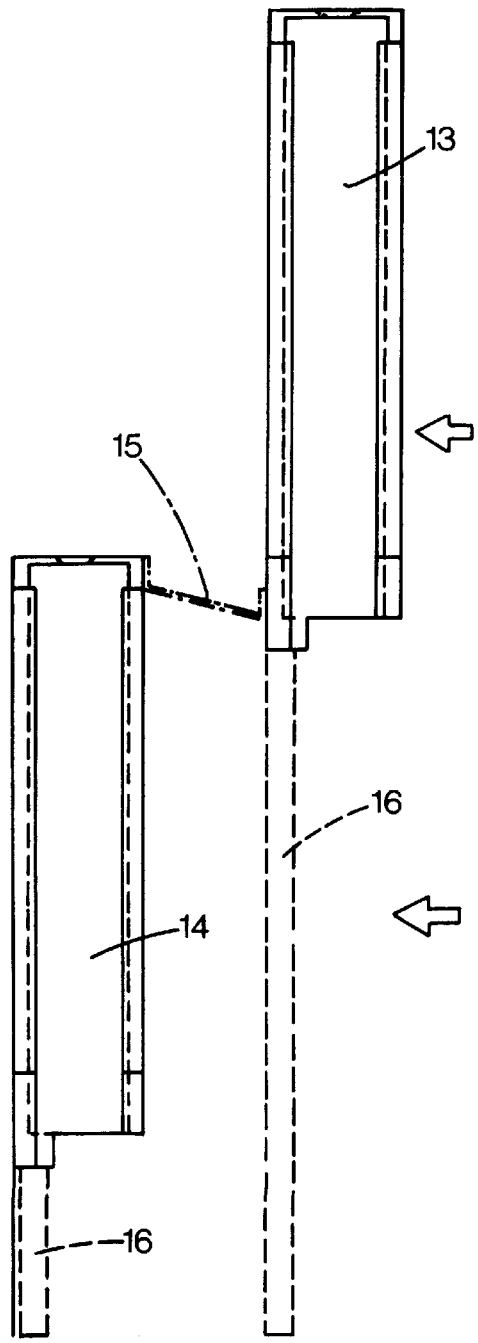

FIGS. 5A and 5B, finally, show a two-part form of the droplet separator. This is shown seen from the side in FIG. 5A and through section A—A in FIG. 5B. The droplet separator consists of an upper part 13 and a lower part 14. The approach flow of steam towards the droplet separators 13 and 14 is in the direction of the arrow from the right and, as can be seen from the figure, the upper part 13 is slightly more displaced towards the flow direction than the lower part 14. Between the droplet separators 13 and 14 there is a partition wall 15, so that the steam will not be able to flow past the separators. Drainage tubes 16 are arranged extending from each droplet separator down to the pool 6 of liquid.

To ensure that steam does not slip past the droplet separators when the surface of the pool 6 of liquid reaches too low a level, a horizontal plate is arranged between the lower part of the skirt and the jacket wall in the lower part 2 on the underside of the droplet separator 14.

The dimensions of the skirt and the lower part 2 of the cylinder 1 can vary, but the outer lower part 2 of the cylinder 1 should have a radius which is 25–200% greater than the radius of the skirt 4, preferably 50–100% greater.

The flow conditions which are customary in the evaporation apparatus according ro the present invention, when it is being used for evaporation of black liquor, are an absolute pressure of 1 –15 bar, preferably 0.07–4 bar, a temperature of 0 –250° centigrade, preferably 40–145° centigrade, and a steam specific volume of 0.12–40 m$^3$ of steam per kilo of steam, preferably 0.5–20 m$^3$ of steam per kilo.

The evaporator has been described as a cylinder with a round cross-section, but a cross-section in the form of a polygon is also conceivable. A stepwise deflection of the flow of steam at the outer wall may in this case be beneficial in separating the droplets.

The invention is not limited to the embodiments which have been shown, and instead it can be varied in different ways within the scope of the patent claims.

What is claitned is:

1. An evaporation apparatus for evaporation of liquids from pulp cooking, comprising:

a vertical cylinder having an inlet opening defined therein for receiving steam and evaporated liquid, the vertical cylinder having a lower part, the vertical cylinder being adapted to generate a downward flow of evaporated liquid and driven-off steam;

an outlet opening defined in the lower part for receiving driven-off steam disposed in the lower part;

a plurality of evaporation surfaces disposed in the vertical cyinder; and a skirt disposed below the evaporation surfaces, the skirt being cylindrical and having a cross-sectional diameter that is smaller than a cross-sectional diameter of the lower part, the skirt surrounding the evaporated liquid and driven-off steam, the skirt having an open bottom and a skirt opening defined in a portion of the skirt that faces away from the outlet opening, the skirt opening being defined by an obliquely cut downward edge.

2. The evaporation apparatus according to claim 1 wherein the skirt opening is defined by an upper obliquely cut edge and a lower vertical edge.

3. The evaporation apparatus according to claim 1 wherein a pool of the evaporated liquid is disposed in a widened part and the skirt has a lower edge that extends into the pool.

4. The evaporation apparatus according to claim 1 wherein the skirt has an inwardly inclined upper part.

5. The evaporation apparatus according to claim 1 wherein the evaporation apparatus further comprises a pair of droplet separators extending vertically in front of and on each side of the outlet opening to horizontally receive the driven-off steam.

6. The evaporation apparatus according to claim 1 wherein droplet separators each has an upper section disposed above a lower section.

7. The evaporation apparatus according to claim 6 wherein the upper section is disposed upstream of the lower section.

8. The evaporation apparatus according to claim 7 wherein the upper and lower sections each has a drainage system for draining liquid from the upper and lower sections into a pool of the evaporated liquid disposed in the widened part.

9. The evaporation apparatus according to claim 1 wherein the lower part is a lower widened part.

* * * * *